(12) United States Patent
Laidlaw

(10) Patent No.: US 6,701,792 B2
(45) Date of Patent: Mar. 9, 2004

(54) TORQUE SENSING APPARATUS FOR MEASURING RELATIVE TORQUE BETWEEN TWO SHAFTS

(75) Inventor: John Laidlaw, Dearborn, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/097,888

(22) Filed: Mar. 14, 2002

(65) Prior Publication Data

US 2003/0037622 A1 Feb. 27, 2003

Related U.S. Application Data

(60) Provisional application No. 60/315,208, filed on Aug. 27, 2001.

(51) Int. Cl.[7] ................................................. G01L 3/02
(52) U.S. Cl. ................................................. 73/862.329
(58) Field of Search .................. 73/862.21, 862.17, 73/862.328, 862.329, 862.334; 862/862.17, 862.328, 862.329, 862.334

(56) References Cited

U.S. PATENT DOCUMENTS

| | | | |
|---|---|---|---|
| 4,415,054 A | | 11/1983 | Drutchas |
| 4,432,245 A | * | 2/1984 | Hattori et al. ........... 73/862.321 |
| 4,724,710 A | * | 2/1988 | Murty ....................... 73/862.23 |
| 4,796,463 A | * | 1/1989 | Tsals et al. ............. 73/862.332 |
| 5,195,382 A | | 3/1993 | Peilloud |
| 5,248,939 A | | 9/1993 | Brauer |
| 5,257,828 A | * | 11/1993 | Miller et al. ................. 180/446 |
| 5,442,956 A | | 8/1995 | Persson |
| 5,625,239 A | | 4/1997 | Persson et al. |
| 6,175,231 B1 | | 1/2001 | Budaker et al. |
| 6,260,423 B1 | | 7/2001 | Garshelis |
| 6,295,879 B1 | | 10/2001 | Miller et al. |
| 6,439,494 B1 | * | 8/2002 | Specht et al. ............ 242/379.1 |

FOREIGN PATENT DOCUMENTS

| | | |
|---|---|---|
| JP | 3044528 | 2/1991 |
| WO | WO 02/071019 A1 | 9/2002 |

\* cited by examiner

*Primary Examiner*—Max Noori
(74) *Attorney, Agent, or Firm*—Brinks Hofer Gilson & Lione

(57) ABSTRACT

A torque sensing device adapted for use in an electric power assisted steering system is provided. In one embodiment, the device comprises first and second shafts interconnected by a torsion bar, a bushing disposed about the torsion bar and frictionally engaged with one of the shafts, and a stator/sensing device assembly. One of the shafts defines a projection while the other shaft defines a recess. The recess receives the projection and allows a limited degree or rotational movement of the projection within the recess. A plurality of magnets is disposed circumferentially about bushing. As a result of the frictional engagement with one of the shafts, the bushing rotates independently of the stator assembly. A sensing device, such as a Hall effect sensor, is positioned within a clearance between first and second poles within the stator and detects relative rotation of the bushing, which is indicative of rotation of the frictionally engaged shaft, within the stator. The sensing device is adapted to transmit a signal based on this measurement that can be utilized by a control module of an EPAS system to effect steering changes.

20 Claims, 4 Drawing Sheets

TORQUE SENSING APPARATUS FOR MEASURING RELATIVE TORQUE BETWEEN TWO SHAFTS

REFERENCE TO PREVIOUS APPLICATION

This application claims the benefit of U.S. Provisional Application No. 60/315,208 filed on Aug. 27, 2001.

FIELD OF THE INVENTION

The present invention relates to torque sensors for measuring the relative rotational movement between two connected shafts. More specifically, the present invention relates to a torque sensor adapted for inclusion in an electric power assisted steering system.

BACKGROUND OF THE INVENTION

Many modern automobiles include a power steering system. A variety of systems are known, including those operating on principles of hydraulics and those that utilize electric motors to assist steering. Regardless of the operational principle, the effect is the same: steering of the vehicle by a driver is easier due to a lower torque threshold needed to effect steering.

In the past, hydraulic power steering systems have been the predominant type of system incorporated in motor vehicles. Unfortunately, these systems have proved inefficient, primarily due to the need to size components needed to respond to steering demands under a broad range of operating conditions.

Electric power assisted steering (EPAS) systems present a more efficient system, and have become an area of rapid development. In these systems, an electric motor provides force to a shaft or a steering rack of the vehicle to assist in turning the wheels of the vehicle. Just as with a hydraulic system, the EPAS system reduces the input torque needed to effect steering of the vehicle.

One problem facing increased acceptance of EPAS systems is the need to package system components within the space typically occupied by conventional hydraulic system components. Accordingly, there is a need for a torque sensing device with improved manufacturability.

SUMMARY OF THE INVENTION

The present invention provides a torque sensing device with components optimized to meet packaging constraints typically present in motor vehicles.

In one embodiment, the torque sensing device comprises first and second shafts. The first shaft defines a projection and the second shaft defines a recess. The recess is adapted to receive the projection and to allow a limited degree of rotational movement of the projection. A torsion bar interconnects the first and second shafts and allows rotational movement of the shafts relative to each other. A bushing is disposed around the torsion bar, and is frictionally engaged with the projection. A plurality of magnets is circumferentially disposed about the bushing. A stator assembly is fixedly mounted to the second shaft and includes first and second poles. One or more sensing devices are disposed in the clearance between the first and second poles. Protective plates can be disposed within the clearance and on first and second sides of the sensing device.

While the invention is defined by the claims appended hereto, additional understanding of the invention can be obtained by review of the following detailed description of preferred embodiments and appended drawings.

DETAILED DESCRIPTION OF THE PREFERRED EMBODIMENTS

The following description of preferred embodiments provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

Figure 1:
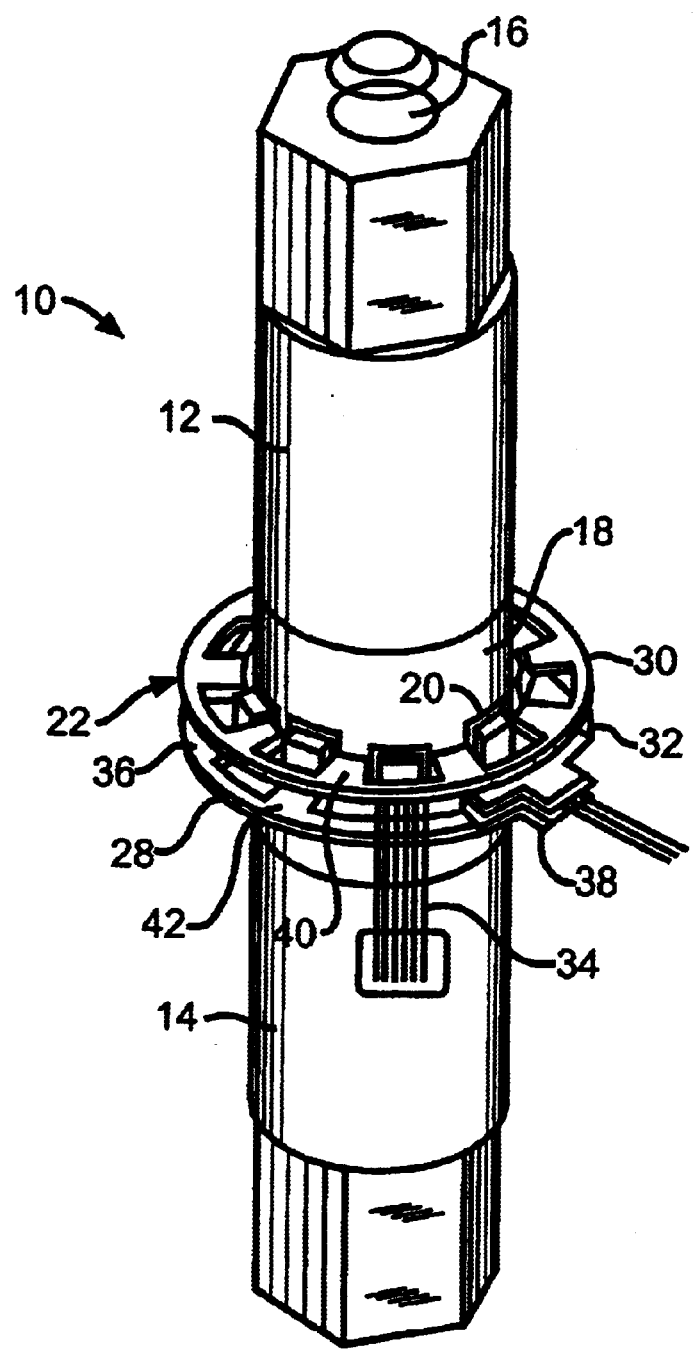
FIG. 1 is a perspective view of a torque sensing device according to a preferred embodiment of the present invention.
Figure 2:
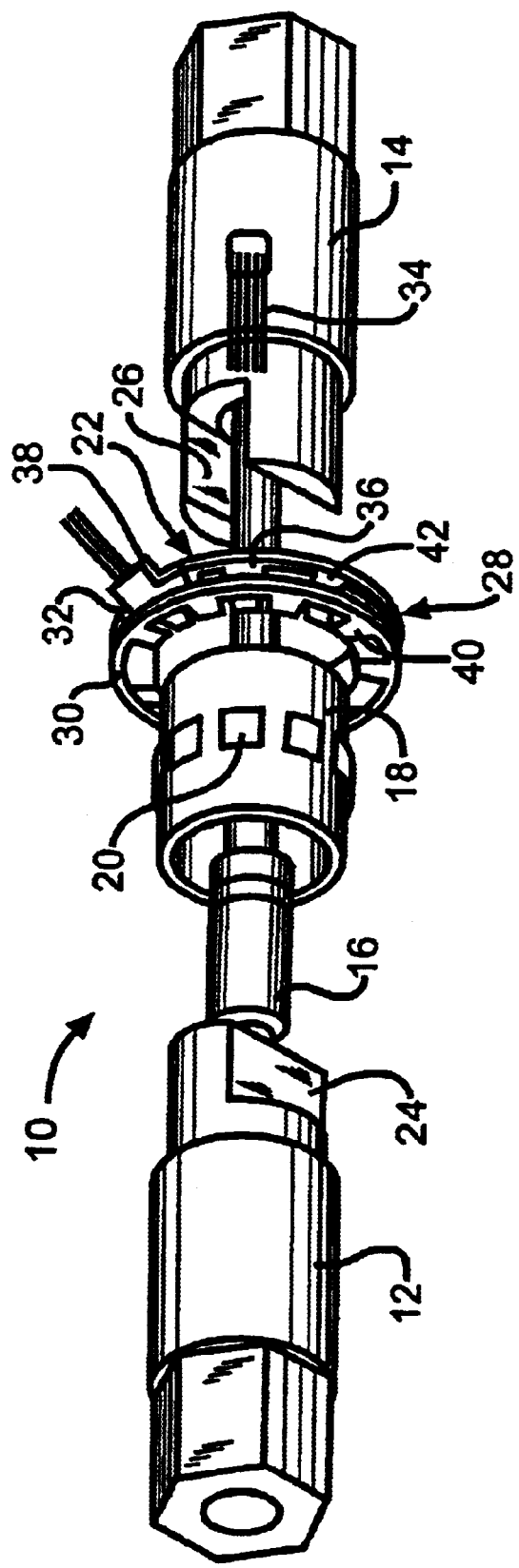
FIG. 2 is an exploded view of the torque sensing device illustrated in FIG. 1.

FIGS. 1 and 2 illustrate a torque sensing device, generally illustrated at 10, according to a first preferred embodiment of the invention. The device 10 includes first 12 and second 14 shafts, a torsion bar 16, a bushing 18, at least one magnet 20, and a stator and sensing device assembly 22.

As indicated above, the torque sensing device 10 is particularly well suited for incorporation into an EPAS system. Accordingly, in a preferred embodiment, the first shaft 12 preferably comprises an input shaft adapted to be connected to a steering wheel of a motor vehicle. Similarly, the second shaft 14 preferably comprises a pinion shaft adapted to be connected to a pinion engaged with a steering rack or other suitable devices, such as a recirculating ball-type device. Of course, it will be readily understood by those skilled in the art that the first and second shafts, as described herein, can readily be interchanged.

As best illustrated in FIG. 2, the first shaft 12 defines a projection 24 on an end facing the second shaft 14. Also, the second shaft 14 defines a recess 26. The recess 26 is adapted to receive the projection 24. Preferably, in the final assembly of the torque sensing device 10, the recess 26 allows the projection 24 a limited degree of rotational movement within the recess 26. This limited movement provides mechanical stops to the movement of the shafts 12, 14 relative to one another. As a result, the limited movement allows localized angular deflection that is dependent on applied steering torque, via the torsion bar 16, but also provides a rigid mechanical coupling between the first 12 and second 14 shafts.

Accordingly, the recess 26 preferably allows sufficient rotational movement of the projection 24 to accommodate the necessary localized angular deflection in the torsion bar 16, but limits the rotational movement to an amount that provides a stable and effective mechanical coupling between the first 12 and second 14 shafts. Accordingly, the recess 26 preferably allows the projection 24 to rotate between approximately six (6) and two (2) degrees from a starting point within the recess 26. More preferable, the recess 26 allows the projection 24 to rotate approximately ±4° from a starting point within the recess 26.

The torsion bar 16 is positioned between the first 12 and second 14 shafts and interconnects the shafts 12, 14 in the conventional manner. Thus, the torsion bar is adapted to allow rotational movement of the first 12 and second 14 shafts relative to one another.

The bushing 18 is circumferentially disposed about the torsion bar 16. As will be developed more fully below, rotation of magnets 20 relative to the stator/sensing device assembly 22 produces a signal that corresponds to the degree of this movement. In an EPAS system, the signal preferably corresponds to relative rotation of one of the shafts, such as the input shaft connected to the steering wheel. Thus, in one preferred embodiment, the bushing 18 is preferably frictionally engaged with one of the shafts 12, 14 such that the bushing 18 rotates with that shaft 12, 14.

Preferably, the bushing 18 is frictionally engaged with the projection 24 of the first shaft 12. For this engagement, any suitable frictional engagement that allows the desired rotation of the bushing 19 with the shaft 12 can be used. Preferably, the bushing 18 is press-fit onto the projection 24. Also preferably, the inner diameter of the bushing 18 is sufficiently large enough to allow the bushing 18 to rotate either freely around the portion of the second shaft 14 that defines recess 26, or with minimal friction. Accordingly, the projection 24 preferably has a width that is larger than the width of the portion of the second shaft 14 that defines the recess 26.

At least one magnet 20 is disposed on an outer surface of the bushing 18. Preferably, as best illustrated in FIG. 2, a plurality of magnets 20 is circumferentially disposed around the bushing 18. Also, preferable, the magnets 20 are arranged in a ring-formation around the bushing 18, with regular spaces between individual magnets 20.

The stator/sensing device assembly 22 includes a stator 28 having first 30 and second 32 poles. The stator assembly is fixedly mounted to the shaft 14 that is not frictionally engaged by the bushing 18. Bracket 34 can be used for such mounting.

The stator 28 defines a clearance 36 between the first 30 and second 32 poles. A sensing device 38, such as a Hall effect sensor, is disposed within the clearance 36 and is adapted to measure a magnetic flux within the clearance and which is related to the relative position of the magnet 20 to the stator 28.

As illustrated in the figures, the first pole 30 preferably defines a first set of fingers 40 and the second pole 32 preferably defines a second set of fingers 42. The first 40 and second 42 sets of fingers are preferably interposed with each other. Also preferable, each finger of the first set 40 extends away from the first pole 30 in a first direction, while each finger of the second set 42 extends away from the second pole 32 in a second direction. Preferably, as illustrated in the figures, the first and second directions are opposing directions. An orthogonal configuration of each finger achieves this desired pattern.

Figure 3:
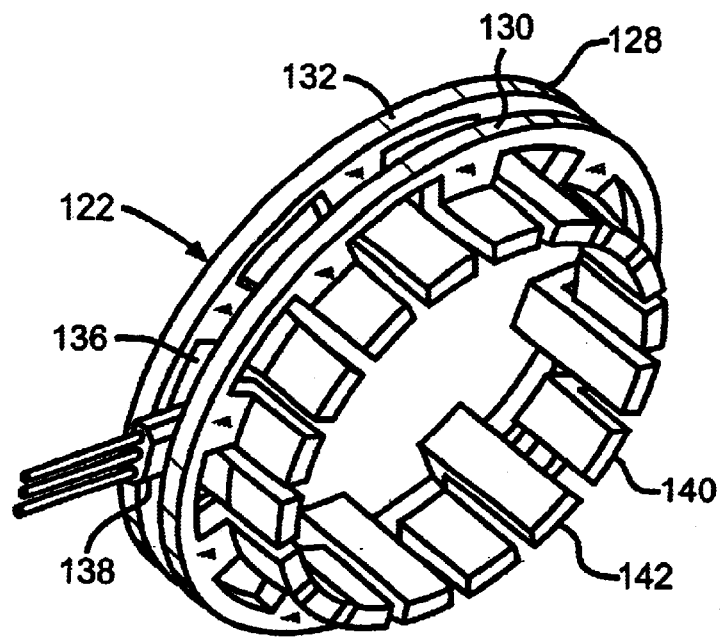
FIG. 3 is a perspective view of a stator and sensing device assembly used in a torque sensing device according to a second preferred embodiment of the present invention.

FIG. 3 illustrates a stator/sensing device assembly 122 for incorporation into a torque sensing device according to a second preferred embodiment of the present invention. In this embodiment, the stator/sensing device assembly 122 has first 130 and second 132 poles, and first 140 and second 142 sets of fingers. In contrast to the first preferred embodiment, however, the first 140 and second 142 sets of fingers extend away from the first 130 and second 132 poles of the stator 128 in the same direction. As a result, the second set of fingers 142 pass underneath the first pole 130 and into the spaces between the first set of fingers 140. Preferably, as illustrated in the figure, the first 140 and second 142 sets of fingers share a common top surface, thereby giving a continuous surface to the stator 128. To accomplish this, the fingers of the second set 142 are generally longer than those of the first set 140.

Similar to the first preferred embodiment, a sensing device 138 is disposed in the clearance 136 between the first 130 and second 132 poles.

Figure 4:
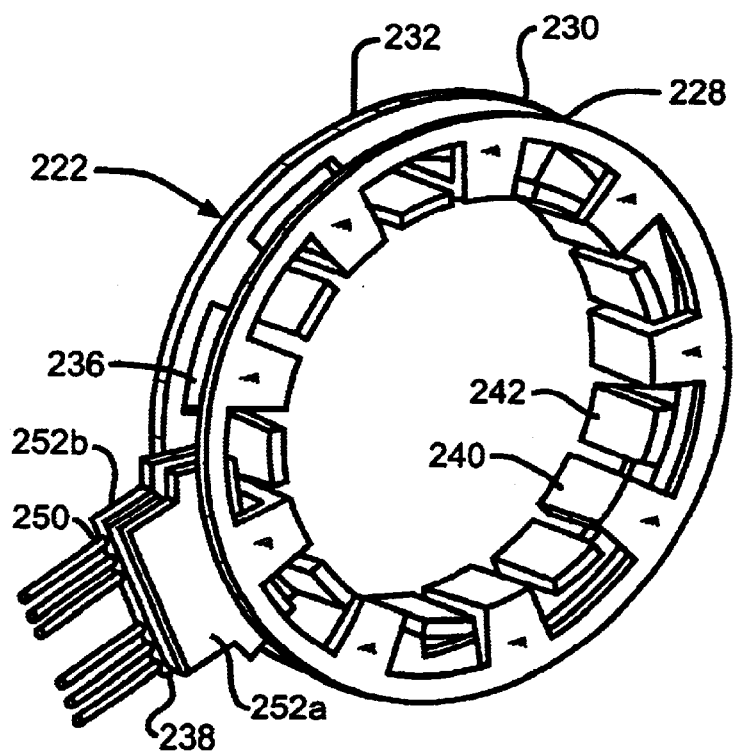
FIG. 4 is a perspective view of a stator and sensing device assembly used in a torque sensing device according to a third preferred embodiment of the present invention.

FIG. 4 illustrates a stator/sensing device assembly 222 for incorporation into a torque sensing device according to a third preferred embodiment of the present invention. This embodiment is similar to the embodiment illustrated in FIGS. 1 and 2, except as detailed below.

The stator/sensing device assembly 222 of this embodiment includes a second sensing device 250 positioned within the clearance 236 between the first 230 and second 232 poles of the stator 228. The second sensing device 250 is similar to the first sensing device 238, and is therefore adapted to measure a magnetic flux within the clearance 236. In this embodiment, the second sensing device 250 is positioned adjacent the first sensing device 238.

Similar to the first preferred embodiment discussed above and illustrated in FIGS. 1 and 2, a first set of fingers 240 are interposed between a second set of fingers 242. Also, each finger of the first set 240 extends away from the first pole 230 in a first direction, while each finger of the second set 242 extends away from the second pole 232 in a second direction. As illustrated in FIG. 4, the first and second directions are preferably opposing directions.

The stator/sensing device assembly 222 also includes a pair of protective plates 252*a*, 252*b* disposed within the clearance 236 between the first 230 and second 232 poles. The protective plates 252*a*, 252*b* shield the sensing devices 250, 238 from mechanical interaction with the poles 230, 232 as they rotate due to rotation of an attached shaft (not illustrated in FIG. 4). Because the protective plates 252*a*, 252*b* may themselves be contacted by the poles 230, 232 as they rotate, the plates 252*a*, 252*b* are advantageously coated with a material that reduces frictional forces that would occur between the poles 230, 232 and the plates 252*a*, 252*b* in the absence of the material. Thus, any conventional material having relatively lower friction characteristics can be used. Suitable materials include those conventionally used to reduce friction in bearings, such as Frelon™ (Frelon is a registered trademark of the Pacific Bearing Corporation of Roscoe, Ill.) and Teflon™ (Teflon is a registered trademark of the E.I. duPont de Nemours Company of Wilmington, Del.). Also preferable, the plates 252*a*, 252*b* are made from a magnetic material, such as a ferromagnetic material.

In this embodiment, the first 252*a* and second 252*b* plates are each preferably sufficiently large to lie adjacent first and second sides, respectively, of the first 238 and second 250 sensing devices.

Figure 5:
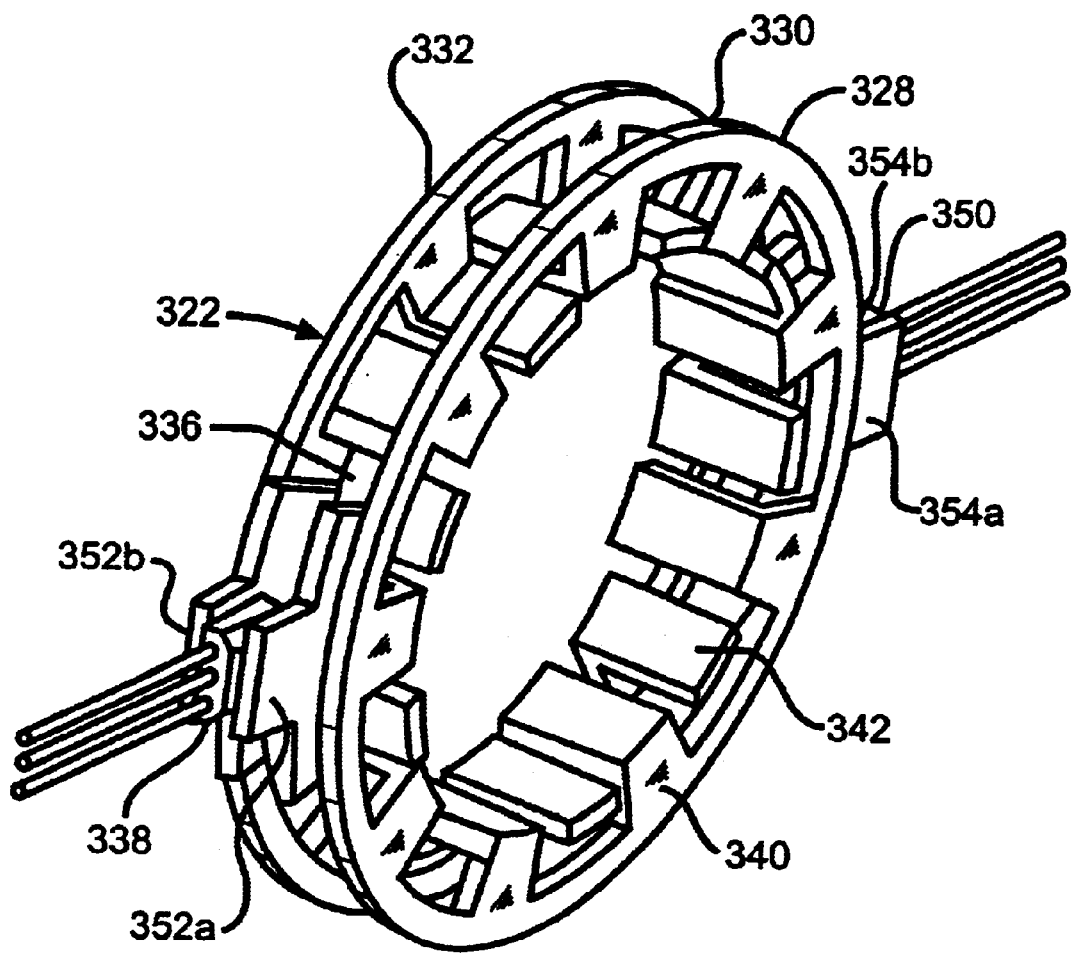
FIG. 5 is a perspective view of a stator and sensing device assembly used in a torque sensing device according to a fourth preferred embodiment of the present invention.

FIG. 5 illustrates a stator/sensing device assembly 322 for use in a torque sensing device according to a fourth preferred embodiment of the present invention. This embodiment is similar to the embodiment illustrated in FIG. 4, except as detailed below.

In this embodiment, the first 338 and second 350 sensing devices are spaced radially from each other. That is, the sensing devices 338, 350 are both positioned within the clearance 336, but are spaced a radial distance from each other. Thus, a phase angle exists between the sensing devices 338, 350. Preferably, as illustrated in FIG. 5, the phase angle separating the first 338 and second 350 sensing devices comprises approximately 180°. The use of a known phase angle between the sensing devices 338, 350 allows for corrective calculations to determine if measurements made by the devices 338, 350 are truly indicative of rotational movement of the bushing (not illustrated in FIG. 5) relative to the stator 328, or if some or all of the measurement is due to non-concentricity of the poles 330, 332. Accordingly, any suitable phase angle between the sensing devices 338, 350 can be utilized. An optimum phase angle can be selected based upon packaging constraints of the stator/sensing device assembly 322 and/or the entire torque sensing device.

Also in this embodiment, a second set of protective plates 354a, 354b is disposed within the clearance 336 and on first and second sides of the second sensing device 350. The first set of protective plates 352a, 352b is disposed within the clearance 336 and on first and second sides of the first sensing device 338. The second set of plates 354a, 354b share the same function and structural characteristics as the first set of protective plates 352a, 352b, which are similar to those in the third preferred embodiment, illustrated in FIG. 4.

The foregoing disclosure includes the best mode devised by the inventors for practicing the invention. It is apparent, however, that several variations may be conceivable by one skilled in the art. Inasmuch as the foregoing disclosure is intended to enable such person to practice the instant invention, it should not be construed to be limited thereby, but should be construed to include such aforementioned variations.

I claim:

1. A torque sensing device adapted to measure the relative torque between two shafts and to transmit a corresponding signal, the device comprising:
   an input shaft and a pinion shaft, one of the input shaft and the pinion shaft defining a projection and the other defining a recess adapted to receive the projection and provide a limited degree of rotational movement to the projection;
   a torsion bar positioned between and interconnecting the input shaft and the pinion shaft and adapted to allow rotational movement of the input shaft and the pinion shaft relative to one another;
   a bushing circumferentially disposed about the torsion bar and frictionally engaged with one of the input shaft and the pinion shaft;
   at least one magnet disposed on the bushing;
   a stator fixedly mounted to the other one of the input shaft and the pinion shaft and extending axially over the at least one magnet; the stator assembly having a first pole and a second pole and defining a clearance between the first pole and the second pole; and
   a sensing device positioned within the clearance and adapted to measure a magnetic flux in the clearance which is related to the relative position of the at least one magnet to the stator assembly.

2. The torque sensing device of claim 1, wherein the bushing is frictionally engaged with the projection.

3. The torque sensing device of claim 2, wherein the input shaft defines the projection.

4. The torque sensing device of claim 1, wherein the at least one magnet comprises a plurality of magnets.

5. The torque sensing device of claim 4, wherein the plurality of magnets are circumferentially disposed on the bushing.

6. The torque sensing device of claim 1, further comprising a pair of plates positioned within the clearance and on first and second sides of the sensing device.

7. The torque sensing device of claim 6, wherein at least one of the pair of plates is coated with a material having relatively low friction characteristics.

8. The torque sensing device of claim 1, further comprising a second sensing device positioned within the clearance and spaced radially from the first sensing device.

9. The torque sensing device of claim 8, wherein the second sensing device is radially spaced from the first sensing device to provide a phase angle of approximately 180°.

10. A torque sensing device adapted to measure the relative torque between two shafts and to transmit a corresponding signal, the device comprising:
    a first shaft;
    a second shaft;
    a torsion bar positioned between and interconnecting the first and second shafts and adapted to allow rotational movement of the first and second shafts relative to one another;
    a bushing circumferentially disposed about the torsion bar and frictionally engaged with the first shaft;
    a plurality of magnets circumferentially disposed on the bushing;
    a stator assembly fixedly mounted to the second shaft, having first and second poles, and defining a clearance between the first and second poles, the first pole defining a first set of fingers and the second pole defining a second set of fingers interposed between the first set of fingers;
    a sensing device positioned within the clearance and adapted to measure a magnetic flux in the clearance which is related to the relative position of the plurality of magnets to the stator assembly.

11. The torque sensing device of claim 10, wherein the first set of fingers project away from the first pole in a first direction and the second set of fingers project away from the second pole in a second direction.

12. The torque sensing device of claim 10, wherein the first set of fingers project in a direction away from the first pole and the second set of fingers project away from the second pole in the same direction.

13. The torque sensing device of claim 10, further comprising a pair of plates positioned within the clearance and on first and second sides of the sensing device.

14. The torque sensing device of claim 13, wherein at least one of the pair of plates is coated with a low friction material.

15. The torque sensing device of claim 10, wherein the first shaft defines a projection and the second shaft defines a recess adapted to receive the projection end to provide a limited degree of rotational movement to the projection.

16. The torque sensing device of claim 10, further comprising a second sensing device positioned within the clearance and spaced radially from the first sensing device.

17. The torque sensing device of claim 16, wherein the second sensing device is radially spaced from the first sensing device to provide a phase angle of approximately 180°.

18. A torque sensing device adapted to measure the relative torque between two shafts and to transmit a corresponding signal, the device comprising:
    a first shaft defining a projection;
    a second shaft defining a recess adapted to receive the projection and to provide a limited degree of rotational movement to the projection;
    a torsion bar positioned between and interconnecting the first and second shafts and adapted to allow rotational movement of the first and second shafts relative to one another;

a bushing circumferentially disposed about the torsion bar and frictionally engaged with the projection;

a plurality of magnets circumferentially disposed on the bushing;

a stator assembly fixedly mounted to the second shaft, having first and second poles, and defining a clearance between the first and second poles, the first pole defining a first set of fingers and the second pole defining a second set of fingers;

a first sensing device positioned within the clearance and adapted to measure a first magnetic flux in the clearance;

a second sensing device positioned within the clearance and adapted to measure a second magnetic flux in the clearance;

a first pair of plates positioned within the clearance and spaced from first and second sides of the first sensing device; and a second pair of plates positioned within the clearance and spaced from first and second sides of the second sensing device.

19. The torque sensing device of claim 18, wherein the recess is adapted to allow the projection to rotate between approximately 2° and 6°.

20. The torque sensing device of claim 18, wherein the recess is adapted to allow the projection to rotate approximately ±4°.

* * * * *

UNITED STATES PATENT AND TRADEMARK OFFICE
CERTIFICATE OF CORRECTION

PATENT NO. : 6,701,792 B2  Page 1 of 1
DATED : March 9, 2004
INVENTOR(S) : John Laidlaw It is certified that error appears in the above-identified patent and that said Letters Patent is hereby corrected as shown below:

Column 6,
Line 3, after "the projection" delete "end" and substitute -- and -- in its place.

Signed and Sealed this

Twenty-fifth Day of May, 2004

JON W. DUDAS
*Acting Director of the United States Patent and Trademark Office*